United States Patent
Umeki et al.

[11] Patent Number: 5,986,865
[45] Date of Patent: Nov. 16, 1999

[54] BATTERY PROTECTION DEVICE AND A BATTERY DEVICE EMPLOYING SUCH A BATTERY PROTECTION DEVICE

[75] Inventors: Nobuaki Umeki; Kouichi Inoue, both of Kyoto, Japan

[73] Assignee: Rohm Co., Ltd., Kyoto, Japan

[21] Appl. No.: 09/179,877

[22] Filed: Oct. 28, 1998

[30] Foreign Application Priority Data

Nov. 25, 1997 [JP] Japan ................................ H9-322533

[51] Int. Cl.$^6$ ........................................................ H02H 3/18
[52] U.S. Cl. ........................... 361/86; 361/91.1; 320/134; 320/136
[58] Field of Search .......................... 361/86, 91.1, 111; 307/10.7; 320/134, 136, 166

[56] References Cited

U.S. PATENT DOCUMENTS

| 5,909,104 | 6/1999 | Scott ........................................ 320/136 |
| 5,914,586 | 6/1999 | Fujita et al. ............................. 320/136 |

Primary Examiner—Michael J. Sherry
Attorney, Agent, or Firm—Nikaido, Marmelstein, Murray & Oram LLP

[57] ABSTRACT

A battery protection device has a charging circuit for charging a capacitor in accordance with an input signal so that the input signal will be distinguished from noise, and an output circuit for generating an output in accordance with the input signal. The battery protection device receives as its input signal a overvoltage detection signal, and the capacitor is charged in accordance with this signal. The output circuit outputs a signal for cutting off the battery charging path in accordance with the overvoltage detection signal. The battery protection device also has a latch circuit for latching the output of the output circuit in a state for outputting the charging path cutoff signal once the voltage across the capacitor exceeds a predetermined level, and an operation-responsive circuit for independently supplying an electric current to the capacitor in response to a predetermined operation. When a change is caused in the voltage across the capacitor by the current supplied from the operation-responsive means, the change is fed to the latch circuit and thereby the latch circuit is unlatched.

10 Claims, 3 Drawing Sheets

BATTERY PROTECTION DEVICE AND A BATTERY DEVICE EMPLOYING SUCH A BATTERY PROTECTION DEVICE

BACKGROUND OF THE INVENTION

1. Field of the Invention

The present invention relates to a battery device having a rechargeable battery such as a lithium-ion cell, and to a battery protection device for use in such a battery device.

2. Description of the Prior Art

A circuit of the type that produces an output signal by processing an input signal it receives is often so designed that, when the input signal once exceeds a predetermined level, the output of the circuit is locked in a fixed state and this locked state is maintained by a latch circuit. For example, in a case where the input signal is a monitoring signal that is used to monitor the condition of a system, such a circuit serves, when the system is in an abnormal condition, to prevent the aggravation of the condition by feeding its output signal back to the system.

Even when the system is brought back into a normal condition, the locked (i.e. latched) state persists. To cancel this locked state, it is necessary to expressly feed an unlatching signal to the latch circuit.

This requires the circuit, when it is formed as an IC (integrated circuit), to be provided with an extra terminal pin for receiving the unlatching signal, and thus to be provided with a larger number of terminal pins in total. This is disadvantageous for the miniaturization of the IC package and of the IC chip. The latched state can be canceled also by temporarily lowering the power source voltage supplied to the IC. However, this undesirably causes all the other circuits in the IC to be reset as well.

SUMMARY OF THE INVENTION

An object of the present invention is to provide a battery protection device that allows cancellation of a latched state without requiring an extra terminal for receiving an unlatching signal, and to provide a battery device that employs such a battery protection device.

To achieve the above object, according to one aspect of the present invention, a battery protection device is provided with: charging means for charging a capacitor in accordance with an input signal so that the input signal will be distinguished from noise; an output circuit for generating an output in accordance with the input signal; a latch circuit for latching the output of the output circuit in a predetermined fixed state once the voltage across the capacitor exceeds a predetermined level; operation-responsive means for independently supplying an electric current to the capacitor in response to a predetermined operation; and unlatching means for unlatching the latch circuit by detecting a change caused in the voltage across the capacitor by the current supplied from the operation-responsive means and feeding the change to the latch circuit.

This arrangement makes it possible to use a single terminal as both a terminal for receiving an unlatching signal and a terminal for connecting an externally fitted capacitor, and thus makes it possible to add an unlatching function without increasing the number of terminals required.

In this arrangement, the operation-responsive means may include an operation switch that, when turned on, connects a power source terminal to the capacitor.

Moreover, the battery protection device may be further provided with a comparator for comparing the voltage across the capacitor with the predetermined level. In this case, the latch circuit is formed as a feedback loop that feeds the output signal of the comparator back to the input side of the comparator, and the unlatching means acts by cutting off the feedback loop somewhere along its path.

Moreover, the comparator may be connected to a clamp circuit composed of a first resistor and a first transistor. In this case, the first resistor has one end connected to an input terminal of the comparator to which the voltage of the capacitor is applied, and the first transistor has its emitter connected to the other end of the first resistor and has its base connected to another input terminal of the comparator to which the predetermined level is applied.

Moreover, the unlatching means may be composed of a second resistor and a second transistor. In this case, the second resistor is connected between the collector of the first transistor and an output potential point, and the second transistor is turned on to cut off the feedback loop when the voltage across the second resistor exceeds the threshold voltage of the second transistor.

According to another aspect of the present invention, a battery device is provided with: a detection circuit for generating a detection signal when a rechargeable battery is in an abnormal condition, a battery protection device as described above that receives as its input signal the detection signal, and cutoff means for cutting off charging or discharging of the battery in response to a signal fed from the output terminal of the battery protection device. This arrangement makes it possible to securely protect the battery against an abnormal condition such as overvoltage, and in addition makes it possible to readily bring the battery back into an operable condition as soon as the cause of the abnormal condition is removed.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
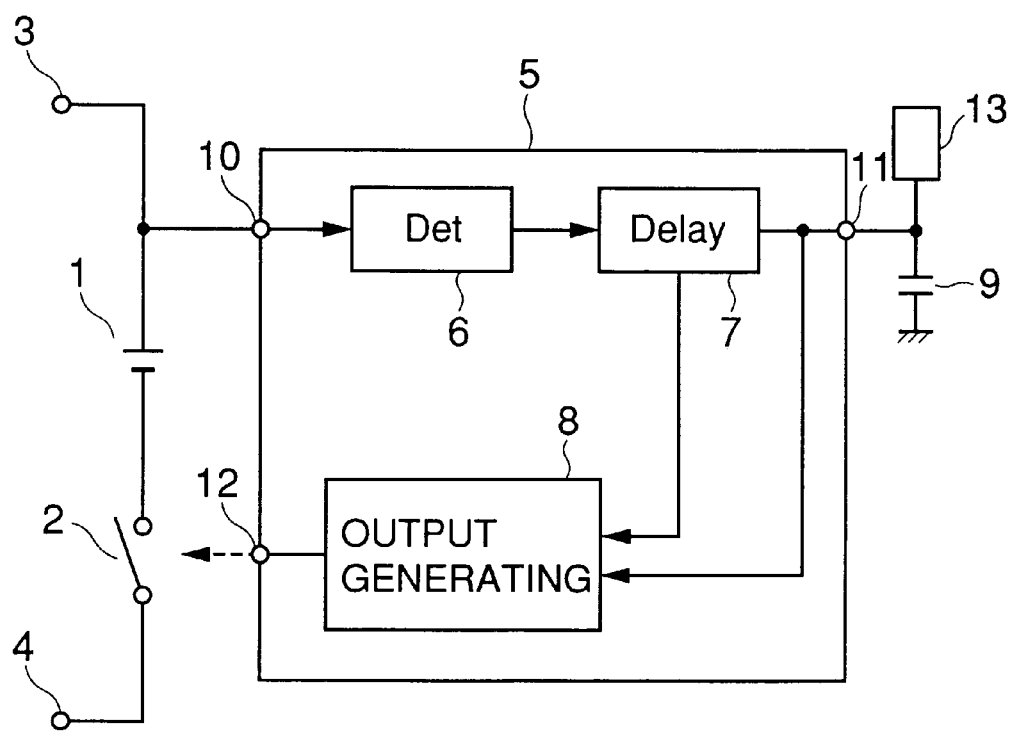
FIG. 1 is a circuit diagram illustrating the outline of a battery protection device, and a battery device employing it, of a first embodiment of the present invention.

Hereinafter, embodiments of the present invention will be described with reference to the drawings. FIG. 1 illustrates the outline of a battery protection device, and a battery device employing it, of a first embodiment of the present invention. In FIG. 1, reference numeral 1 represents a rechargeable battery composed of one or more lithium-ion cells; reference numeral 2 represents a cutoff switch; reference numerals 3 and 4 represent terminals for connecting a load. The cutoff switch 2 is realized by the use of a fuse or FET (field-effect transistor).

Reference numeral 5 represents a semiconductor integrated circuit device (hereafter referred to simply as the "IC") for protecting the battery 1. Reference numeral 6 represents a detection circuit that outputs an overvoltage detection signal when the voltage of the battery 1, which is fed to the IC 5 via a terminal 10 thereof, is above a predetermined level. Reference numeral 7 represents a delay circuit for delaying the output of the detection circuit 6. The delay time of the delay circuit 7 is determined by a capacitor 9 that is externally connected to the IC 5 via another terminal 11 thereof.

The delay circuit 7 serves to prevent malfunction due to noise by inhibiting the output during the delay time (i.e. by securing an insensitive period). Accordingly, no noise shorter than this insensitive period is permitted to appear at the output. On the other hand, when the battery is kept in an overvoltage condition longer than the delay time, the overvoltage detection signal, which the detection circuit 6 outputs when it detects overvoltage, is permitted to be fed to an output generating circuit 8.

On receiving the overvoltage detection signal, the output generating circuit 8 outputs a signal that causes the switch 2 to be turned off. This signal is fed to the switch 2 via another terminal 12 of the IC 5. The output generating circuit 8 is so configured that, in an abnormal condition such as overvoltage, it locks (i.e. latches) itself so that the switch 2 will be kept off.

Thus, the output generating circuit 8 remains in a latched state even after overvoltage has disappeared, and therefore the latched state needs to be canceled expressly at an appropriate time. Cancellation of the latched state is achieved by causing a change in the voltage across the capacitor 9 by the use of an operation-responsive circuit 13 that supplies an electric current to the capacitor 9 in response to a predetermined operation. This allows the latch circuit to be unlatched when the output generating circuit 8 detects the change in the voltage across the capacitor 9.

Figure 2:
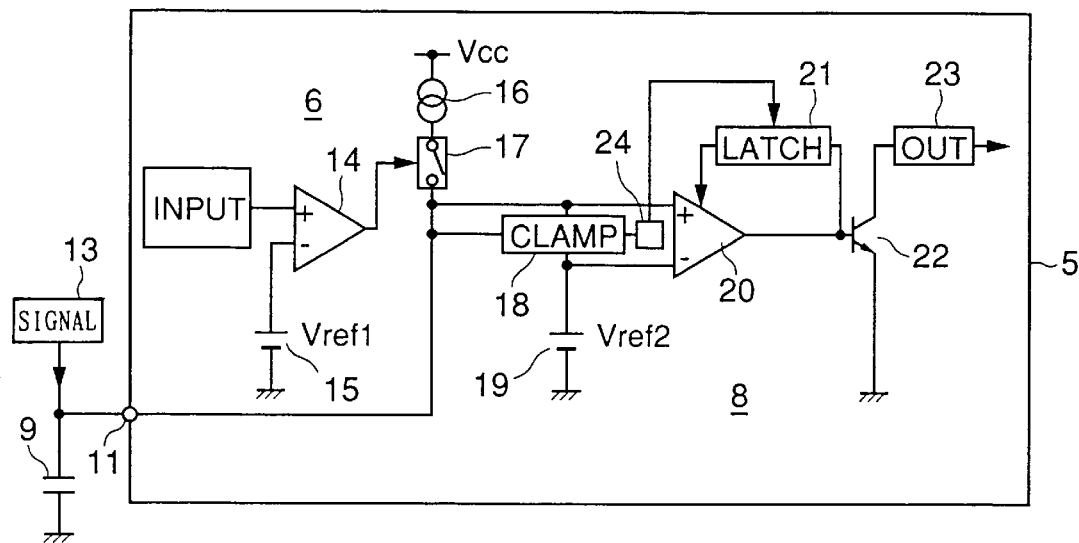
FIG. 2 is a circuit diagram illustrating in more detail the circuit shown in FIG. 1.

FIG. 2 illustrates in more detail the circuit shown in FIG. 1. As shown in this figure, the detection circuit 6 is composed of a comparator 14 and a reference voltage source 15 for feeding a reference voltage $V_{ref1}$ to the inverting terminal (−) of the comparator 14. The comparator 14 receives at its non-inverting terminal (+) an input signal (in this case, the voltage of the battery), and, when the voltage of this signal is higher than the reference voltage $V_{ref}$, the comparator 15 outputs a high level and thereby turns on a switch 17.

This switch 17, together with a constant current source 16 and the capacitor 9, constitutes the delay circuit 7. The output generating circuit is composed of a clamp circuit 18, a reference voltage source 19 for producing a reference voltage $V_{ref2}$, a comparator 20, a latch circuit 21, a transistor 22, an output circuit 23, and other components. The comparator 20 receives, at its non-inverting terminal (+), the voltage of the capacitor 9, and, at its inverting terminal (−), the reference voltage $V_{ref2}$.

When the switch 17 is on, the capacitor 9 is charged, and when the voltage across it exceeds the reference voltage $V_{ref2}$, the comparator 20 outputs a high level and thereby turns on the transistor 22. As a result, the output circuit 23 outputs a voltage that turns off the switch 2 (FIG. 1). On the other hand, the latch circuit 21 latches the comparator 20 so that the output of the comparator 20 will be kept at a high level. This latched state persists even after the voltage across the capacitor 9 has dropped.

Cancellation of the latched state is achieved by activation of the operation-responsive circuit 13. When the operation-responsive circuit 13 is activated, the voltage across the capacitor 9 rises, and the latch circuit 21 is unlatched by way of the clamp circuit 18 and an unlatching circuit 24 as will be described in more detail below with reference to FIG. 3.

Figure 3:
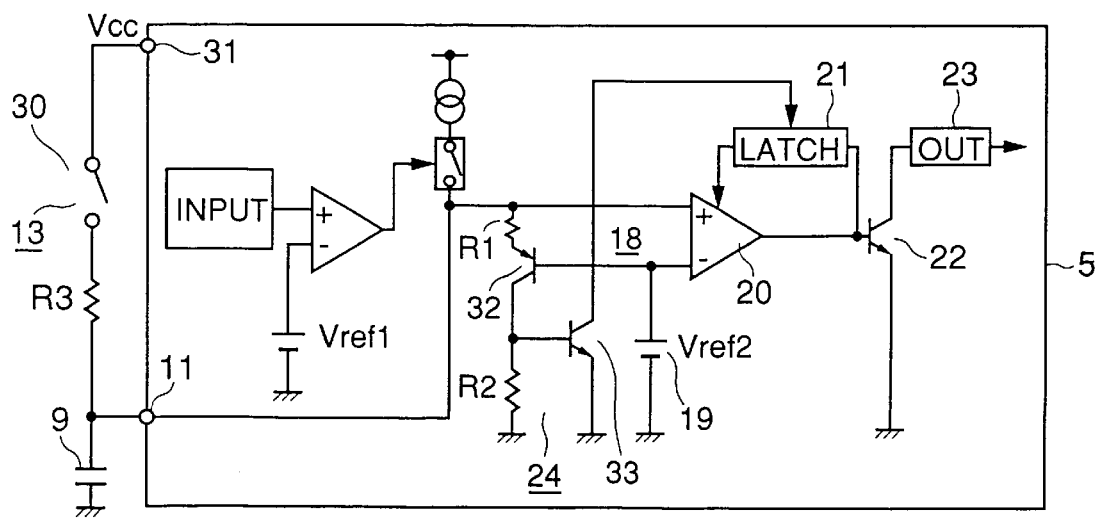
FIG. 3 is a circuit diagram illustrating in further detail a part of the circuit shown in FIG. 2.

FIG. 3 illustrates in further detail the operation-responsive circuit 13, the clamp circuit 18, and the unlatching circuit 24. In this figure, reference numeral 30 represents an operation switch that has one end connected to a power source terminal 31 of the IC 5 and has the other end connected to the capacitor 9 by way of a resistor R3. Thus, the operation-responsive circuit 13 is composed of the power source terminal 31, the switch 30, and the resistor R3.

The clamp circuit 18 is composed of a resistor R1 and a pnp-type transistor 32. The emitter of the transistor 32 is connected, by way of the resistor R1, to the capacitor 9 and to the non-inverting terminal (+) of the comparator 20. The base of the transistor 32 is connected to the reference voltage source 19 and to the inverting terminal (−) of the comparator 20. The unlatching circuit 24 is composed of a resistor R2 and an npn-type transistor 33.

The resistor R2 has one end connected to the collector of the transistor 32, and has the other end connected to ground. The transistor 33 has its base connected to the ungrounded end of the resistor R2, has its emitter connected to ground, and has its collector connected to the latch circuit 21.

When the switch 30 is turned on and the voltage across the capacitor 9 rises, the collector current of the transistor 32 increases until eventually the voltage across the resistor R2 exceeds the threshold voltage of the transistor 33 and thereby the transistor 33 is turned on. This causes an unlatching signal to be fed to the latch circuit.

Figure 4:
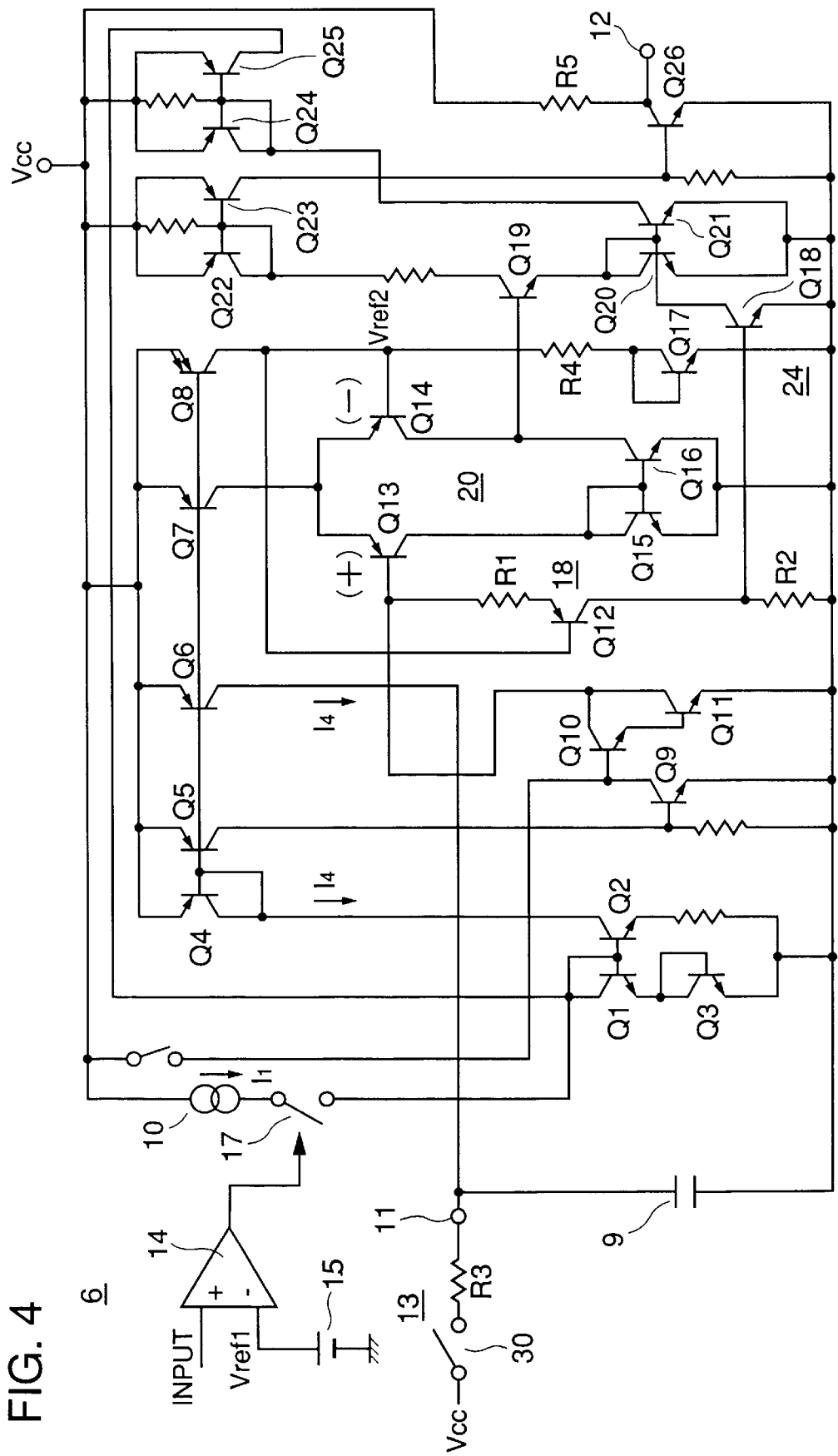
FIG. 4 is a circuit diagram illustrating a battery protection device, and a battery device employing it, of a second embodiment of the present invention.

FIG. 4 illustrates a battery protection device, and a battery device employing it, of a second embodiment of the present invention. In FIG. 4, those components which have their counterparts in FIG. 2 are identified with the same reference numerals and symbols. When a switch 17 is turned on, a current $I_1$ flows from a current source 10 to a current mirror circuit formed by transistors Q1 to Q3, and this causes a current $I_4$ to flow through the collector of the transistor Q2. This current $I_4$ flows through a transistor Q4, and, since this transistor Q4 forms another current mirror circuit together with transistors Q5 to Q8, this causes a current $I_4$ of the same amount to flow through the transistor Q6. This current $I_4$ flows into a capacitor 9 and thereby raises the voltage across the capacitor 9.

Two pnp-type transistors Q13 and Q14 and two npn-type transistors Q15 and Q16 constitute a comparator 20. The base of the transistor Q13 serves as the non-inverting terminal (+) of the comparator 20, and the base of the transistor Q14 serves as the inverting terminal (−) of the comparator 20. To the inverting terminal (−) is applied a reference voltage $V_{ref2}$ which is generated by the transistor Q8 with the help of a resistor R4 and a diode-connected transistor Q17.

A resistor R1 and a pnp-type transistor Q12 constitute a clamp circuit 18. The base of the transistor Q12 is connected to the base of the transistor Q14 (i.e. to the inverting terminal of the comparator 20). The output of the comparator 20 is fed from the collector of the transistor 14 through the collector of the transistor Q19 and then through transistors Q22 and Q23 (forming a current mirror circuit) to a transistor Q26, and is then delivered to an output terminal 12 through a resistor R5, which corresponds to the output circuit 23 shown in FIG. 2, and the transistor Q26, which corresponds to the transistor 22 shown in FIG. 2.

Moreover, the output of the comparator 20 is fed from the emitter of the transistor Q19 through a current mirror circuit (Q20 and Q21) and then through another current mirror circuit (Q24 and Q25) back to the current mirror circuit (Q1 and Q2), and further through the transistors Q4 and Q6 back to the base of the transistor Q13 of the comparator 20. This loop constitutes the latch circuit 21. A resistor R2 and a transistor Q18 constitute an unlatching circuit 24. When the transistor Q18 of this unlatching circuit 24 is turned on, the current mirror circuit (Q20 and Q21) is turned off. This causes the above feedback loop to be cut off, and thereby the latch circuit is unlatched.

Thus, now that the voltage across the capacitor 9 has already dropped, the latched state can be canceled simply by temporarily turning off the current mirror circuit (Q20 and Q21) placed in the path of the feedback loop. When the high level applied to the base of the transistor Q13 by way of the feedback loop is cut off, within the comparator 20, the transistor 13 is turned on and the transistor 14 is turned off. Consequently, the comparator 20 stops outputting the high level, and the feedback loop (and thus the latch circuit) ceases acting as such.

In the same sense, it is only temporarily that the transistor 18 of the unlatching circuit 24 is turned on (when the raised voltage across the capacitor 9 is added to the already high voltage that is fed back to the base of the transistor Q13 by way of the feedback loop, the transistor Q18 is turned on, and this causes the feedback voltage to drop to zero, leaving the voltage across the capacitor 9 to remain alone). In other words, the unlatching circuit 24 operates in accordance with the variation of the voltage across the capacitor 9. Note that, when the switch 30 is kept on, the transistor Q18 is turned on again and remains on thereafter. However, since raising the voltage across the capacitor 9 by keeping it supplied with the power source voltage Vcc brings about the same condition as when an overvoltage detection signal is fed in, it is preferable to use as the switch 30 a switch of the type that rebounds back to the off position as soon as it is released.

What is claimed is:

1. A battery protection device comprising:

charging means for charging a capacitor in accordance with an input signal so that the input signal will be distinguished from noise;

an output circuit for generating an output in accordance with the input signal;

a latch circuit for latching the output of the output circuit in a predetermined fixed state once a voltage across the capacitor exceeds a predetermined level;

operation-responsive means for independently supplying an electric current to the capacitor in response to a predetermined operation; and unlatching means for unlatching the latch circuit by detecting a change caused in the voltage across the capacitor by the current supplied from the operation-responsive means and feeding the change to the latch circuit.

2. A battery protection device as claimed in claim 1, wherein the operation-responsive means includes an operation switch that, when turned on, connects a power source terminal to the capacitor.

3. A battery protection device as claimed in claim 1, further comprising:

a comparator for comparing the voltage across the capacitor with the predetermined level, wherein the latch circuit is formed as a feedback loop that feeds an output signal of the comparator back to an input side of the comparator, and the unlatching means acts by cutting off the feedback loop somewhere along its path.

4. A battery protection device as claimed in claim 3, wherein the comparator is connected to a clamp circuit composed of a first resistor and a first transistor, the first resistor having one end connected to an input terminal of the comparator to which the voltage across the capacitor is applied, the first transistor having an emitter connected to the other end of the first resistor and having a base connected to another input terminal of the comparator to which the predetermined level is applied.

5. A battery protection device as claimed in claim 4, wherein the unlatching means is composed of a second resistor and a second transistor, the second resistor being connected between the collector of the first transistor and an output potential point, the second transistor being turned on to cut off the feedback loop when a voltage across the second resistor exceeds a threshold voltage of the second transistor.

6. A battery device comprising a detection circuit for generating a detection signal when a rechargeable battery is in an abnormal condition, a battery protection device that receives as its input signal the detection signal, and cutoff means for cutting off charging or discharging of the battery in response to a signal fed from an output terminal of the battery protection device:

wherein the battery protection device comprises:

charging means for charging a capacitor in accordance with the input signal so that the input signal will be distinguished from noise;

an output circuit for generating an output in accordance with the input signal;

a latch circuit for latching the output of the output circuit in a predetermined fixed state once a voltage across the capacitor exceeds a predetermined level;

operation-responsive means for independently supplying an electric current to the capacitor in response to a predetermined operation; and unlatching means for unlatching the latch circuit by detecting a change caused in the voltage across the capacitor by the current supplied from the operation-responsive means and feeding the change to the latch circuit.

7. A battery device as claimed in claim 6, wherein the operation-responsive means includes an operation switch that, when turned on, connects a power source terminal to the capacitor.

8. A battery device as claimed in claim 6, further comprising:

a comparator for comparing the voltage across the capacitor with the predetermined level, wherein the latch circuit is formed as a feedback loop that feeds an output signal of the comparator back to an input side of the comparator, and the unlatching means acts by cutting off the feedback loop somewhere along its path.

9. A battery device as claimed in claim 8, wherein the comparator is connected to a clamp circuit composed of a first resistor and a first transistor, the first resistor having one end connected to an input terminal of the comparator to which the voltage across the capacitor is applied, the first transistor having an emitter connected to the other end of the first resistor and having a base connected to another input terminal of the comparator to which the predetermined level is applied.

10. A battery device as claimed in claim 9, wherein the unlatching means is composed of a second resistor and a second transistor, the second resistor being connected between the collector of the first transistor and an output potential point, the second transistor being turned on to cut off the feedback loop when a voltage across the second resistor exceeds a threshold voltage of the second transistor.

* * * * *